United States Patent [19]

Welsh

[11] Patent Number: 4,931,645

[45] Date of Patent: Jun. 5, 1990

[54] DETECTOR FOR MEASUREMENT OF RADIATION

[75] Inventor: Luther Welsh, Mountain View, Calif.

[73] Assignee: National Nuclear Corporation, Santa Clara, Calif.

[21] Appl. No.: 232,692

[22] Filed: Aug. 16, 1988

[51] Int. Cl.$^5$ .............................. G01T 1/20; G01J 1/58
[52] U.S. Cl. .............................. 250/361 R; 250/483.1; 250/369
[58] Field of Search ............... 250/361 R, 363, 368, 250/207, 483.1

[56] References Cited

U.S. PATENT DOCUMENTS

| | | | |
|---|---|---|---|
| 2,694,152 | 11/1954 | Teichmann | 250/369 |
| 2,721,943 | 10/1955 | Armistead | 250/369 |
| 2,759,107 | 8/1956 | Armistead et al. | 250/369 |
| 3,139,527 | 6/1964 | Eberline | 250/369 |
| 3,149,235 | 9/1964 | Clark | 250/207 |
| 4,066,908 | 1/1978 | Faukhi et al. | 250/361 R |
| 4,503,328 | 3/1985 | Neufeld | 250/262 |
| 4,560,882 | 12/1985 | Barbaric et al. | 250/483.1 X |
| 4,631,409 | 12/1986 | Sparacia et al. | 250/483.1 X |
| 4,795,910 | 1/1989 | Henderson et al. | 250/483.1 |
| 4,829,185 | 5/1989 | Cerff | 250/361 R |

Primary Examiner—Constantine Hannaher
Assistant Examiner—J. Eisenberg
Attorney, Agent, or Firm—Flehr, Hohbach, Test, Albritton & Herbert

[57] ABSTRACT

A scintillation detector comprising a solid luminophor with a photomultiplier tube having its face abutting one surface of the luminophor to receive light generated in the luminophor by impinging radiation. The luminophor 11 includes polished outer surfaces 12 covered by light reflective opaque material 13 such as a thin aluminum foil or mylar coated with an aluminum reflecting film. The metal film blocks ambient and internal light while allowing radiation such as gamma rays or beta particles to penetrate, strike the luminophor and cause scintillation. Light emitted by the scintillation is directed through opening 14 to strike the face of photomultiplier tube 16.

4 Claims, 2 Drawing Sheets

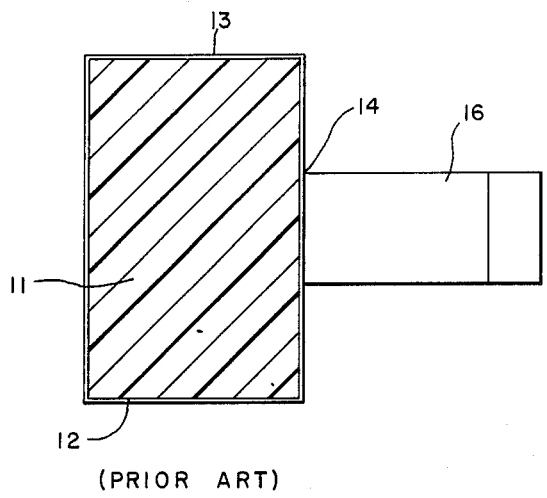
(PRIOR ART)
FIG.—1
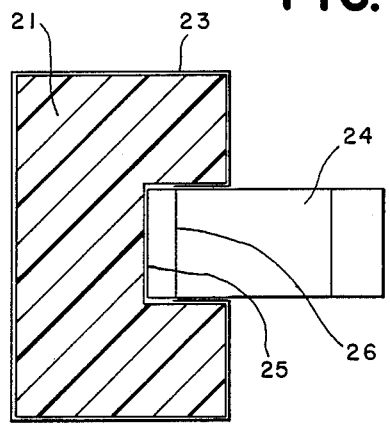
FIG.—2
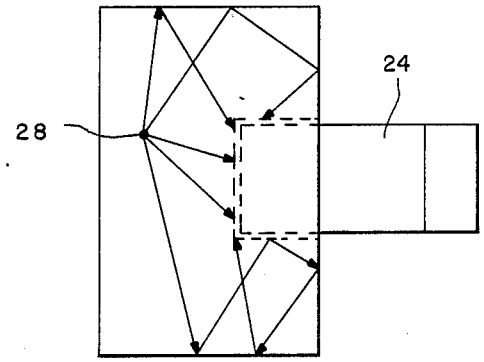
FIG.—4
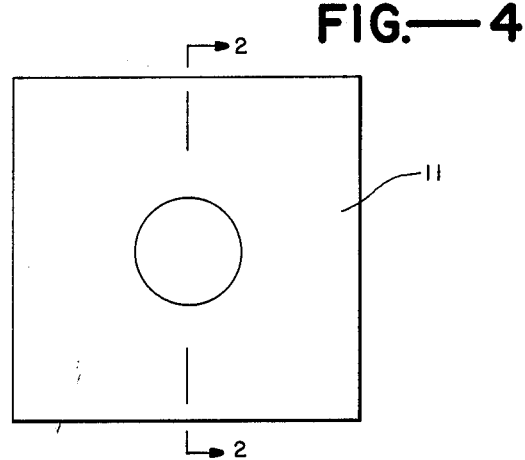
FIG.—3

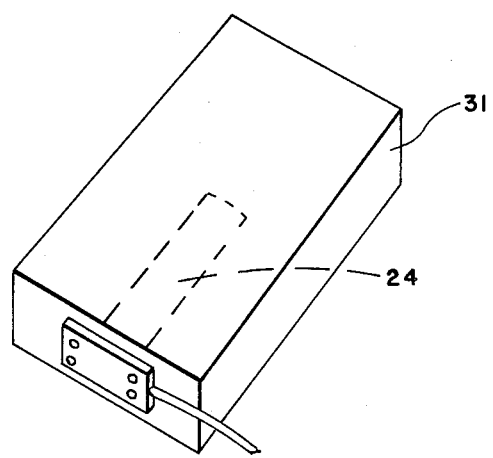
FIG.—5
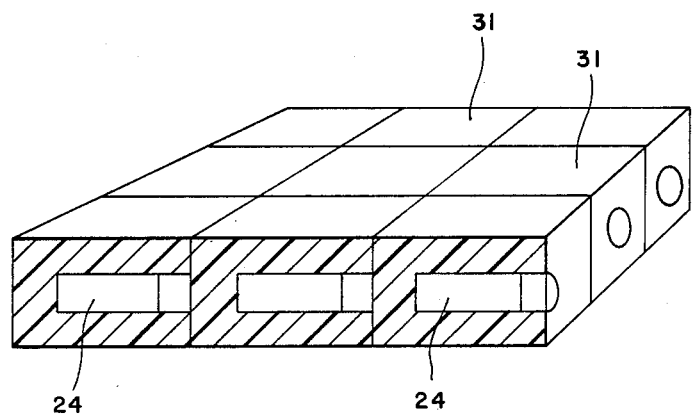
FIG.—6

DETECTOR FOR MEASUREMENT OF RADIATION

SUMMARY OF THE INVENTION

This invention relates to a detector for detecting radiation such as gamma and beta radiation.

BACKGROUND OF THE INVENTION

There have been a number of radiation detectors proposed in the prior art. U.S. Pat. No. 2,694,152 describes a detector which comprises a Geiger-Mueller counter positioned adjacent solid luminophor for detecting scintillations resulting from interaction between the radiation and the luminophor. In one embodiment the detector is positioned within a cylindrical surrounding luminophor material. U.S. Pat. No. 2,721,943 describes a detector which comprises a liquid luminophor with a light detector immersed in the liquid. U.S. Pat. No. 2,759,107 describes a scintillometer which includes a photomultiplier partly immersed in a gaseous luminophor. U.S. Pat. No. 3,139,527 describes a scintillation detector in which a scintillation crystal is disposed adjacent the face of a photomultiplier tube whereby light from the luminophor impinges upon the cathode of the photomultiplier.

The assignee of the present invention has manufactured scintillation detectors comprising a solid luminophor with a photomultiplier tube having its face abutting one surface of the luminophor to receive light generated in the luminophor by impinging radiation. Such a scintillation detector is schematically shown in FIG. 1. It includes a luminophor 11 having polished outer surfaces 12 covered by light reflective opaque material 13 such as thin aluminum foil or mylar coated with an aluminum reflecting film. The metal film is of such thickness that it blocks light, however, allows radiation such as gamma rays and beta particles to penetrate and strike the luminophor and excite scintillations. The covering film 13 includes an opening 14 through which light from scintillations can emerge and strike the face of a multiplier tube 16 which is supported (not shown) with its face against the surface of the luminophor to receive the light and provide an amplified output signal.

A major problem with the prior art detectors is that they are expensive to manufacturer because of the need for securely supporting and physically protecting the photomultiplier tube and to maintain it in contact with the face. As a result, the detector assembly is generally large and cumbersome. Multiple detectors can only be stacked in side-by-side relationship because the photomultiplier tubes extend from the side of the luminophor. The scintillation light is not efficiently collected.

OBJECTS AND SUMMARY OF THE INVENTION

It is an object of the present invention to provide a radiation detector in which a photomultiplier is partially or totally embedded in a solid luminophor to increase light collection and provide mechanical support for the tube.

It is another object of the present invention to provide radiation detector in which a photomultiplier tube is disposed entirely within the luminophor whereby to minimize the overall space required for the detector and to permit side-by-side or end-to-end stacking of detectors.

It is still another object of the present invention to provide a radiation detector which efficiently collects light energy from scintillations generated in the luminophor by impinging radiation.

The foregoing and other objects are achieved by a detector which includes a luminophor having polished outer surfaces with a well for receiving a predetermined portion of an associated photomultiplier tube. A light opaque reflecting film is placed on the outer surfaces of the luminophor to prevent light from entering the luminophor and to deflect light rays within the luminophor so that they impinge upon the photomultiplier tube.

BRIEF DESCRIPTION OF THE DRAWINGS

The foregoing and other objects of the invention will be more clearly understood from the following description taken in connection with the accompanying drawings of which:

FIG. 1 shows partly in section a detector assembly in accordance with the prior art.

FIG. 2 shows partly in section a detector assembly in accordance with the present invention with the section taken along the line 2—2 of FIG. 3.

FIG. 3 is a rear view of the detector assembly of FIG. 2.

FIG. 4 shows a light ray diagram for the detector assembly of FIGS. 2 and 3.

FIG. 5 is a perspective view of another embodiment of a detector in accordance with the present invention.

FIG. 6 shows partly in section a plurality of detectors stacked side-by-side and end-to-end to provide a large area detecting surface.

DESCRIPTION OF THE PREFERRED EMBODIMENT

Referring to FIGS. 2 and 3, a solid block of luminophor material 21 is provided with a well or depression 22. The outer surfaces of the luminophor including the walls of the well are polished and a reflective film 23, such as aluminum, is applied to the outer surface. In the alternative, the film may be a mylar film which has been aluminized. In either event, the film serves two purposes: (1) it blocks any external light from entering the luminophor and reaching the photomultiplier giving false indications; and (2) it provides reflection of generated light within the luminophor so that it eventually impinges upon the end of the photomultiplier tube 24. More particularly, the photomultiplier tube 24 is inserted in the well with its end 25 in contact with the bottom surface of the well. As is well known, the photomultiplier side walls include a reflective material which extends to near the end, leaving a band 26 which is transparent. Thus, light not only impinges on the cathode of the photomultiplier tube from the end 25 but also through the transparent adjacent sides 26.

It has been found that this arrangement collects a substantially greater percentage of the light generated in the luminophor by impinging radiation than the embodiment of FIG. 1. This is somewhat schematically illustrated in FIG. 4 wherein the direction of some of the rays generated at the point 28 are shown reflecting from the surface and eventually finding their way to the photomultiplier tube.

Preferably, a silicon grease is applied between the photomultiplier tube and the well walls to provide a very efficient light transmission between the photomultiplier tube and the wells. This reduces any reflection from the walls and provide the best possible optical coupling of the tube cathode to the luminophor material.

It is seen that the photomultiplier tube is substantially self supporting in that it is supported from the walls of the well in the luminophor. Elaborate support systems are not necessary for the tube or detector assembly.

In FIG. 5, the photomultiplier tube 24 is shown as completely encased within the box-like luminophor material 31 thereby providing a detector envelope which is substantially the same as the envelope of the luminophor material. Detectors of the type shown in FIG. 5 can be placed side-by-side and end-to-end as schematically shown in FIG. 6 wherein six such devices are shown to form an enlarged panel for the reception of radiation.

Thus, it is seen that it has been provided an improved, sturdy detector with high collection efficiency and simplicity in manufacture and assembly.

I claim:

1. A radiation detector comprising:
   a solid translucent luminophor member having polished outer surfaces with a well formed in said luminophor;
   a thin film of radiation transparent light reflective material applied to the outer surfaces of said luminophor member whereby to reflect light generated by scintillations occurring within said luminophor resulting from interaction of the luminophor with radiation impinging thereon; and
   a photomultiplier tube of the type having an end window extending partially along the side of the tube inserted in said well whereby the light generated by said scintillations is coupled into the photomultiplier tube.

2. A detector as in claim 1 in which the well receives the entire photomultiplier tube.

3. A detector as in claims 1 or 2 in which the walls of the well have a thin film of radiation transparent reflective material applied thereto.

4. A large area detector comprising a plurality of detectors of claim 2 disposed in side-by-side and end-to-end relationship.

* * * * *